United States Patent [19]

Hench, Sr. et al.

[11] 3,976,254
[45] Aug. 24, 1976

[54] MACHINE FOR GRANULATING STRANDS OF MATERIAL

[75] Inventors: Hans Hench, Sr.; Friedrich Hunke, both of Grossostheim; Claus Wolber, Hosbach, all of Germany

[73] Assignee: Automatik Apparate-Maschinenbau Hans Hench GmbH, Grossostheim, Germany

[22] Filed: Sept. 3, 1975

[21] Appl. No.: 609,986

Related U.S. Application Data

[63] Continuation of Ser. No. 494,494, Aug. 5, 1974, abandoned.

[30] Foreign Application Priority Data

Aug. 10, 1973 Germany............................ 2340614

[52] U.S. Cl. ........................... 241/222; 198/127 R; 241/223; 271/274
[51] Int. Cl.² ................... B02C 23/02; B02C 18/44
[58] Field of Search ........................... 241/222–223; 198/127 R; 271/272–275

[56] References Cited
UNITED STATES PATENTS

| 692,601 | 2/1902 | Berger | 241/222 |
|---|---|---|---|
| 2,176,039 | 10/1939 | Umansky | 198/127 R UX |
| 3,635,466 | 1/1972 | Townsend | 271/272 |
| 3,837,586 | 9/1974 | Perschbacher et al. | 241/223 |
| 3,840,109 | 10/1974 | Kohl | 198/127 R |

FOREIGN PATENTS OR APPLICATIONS 1,235,037  5/1960  France .............................. 271/274

Primary Examiner—Granville Y. Custer, Jr.
Assistant Examiner—Howard N. Goldberg
Attorney, Agent, or Firm—W. G. Fasse; W. W. Roberts

[57] ABSTRACT

The present material transport device for a granulating apparatus includes a plurality of transport pressure rollers arranged in a curved row for cooperation with a transport cylinder of the granulating apparatus. An infeed table extends substantially tangentially relative to the transport cylinder which forms with the first pressure rollr of said row an infeed point. A run-off table extends also substantially tangentially relative to said transport cylinder and forms with its downstream end a counter ledge for a rotary knife. The row of pressure rollers extends around the transport cylinder from said infeed point substantially to said counter ledge.

10 Claims, 1 Drawing Figure

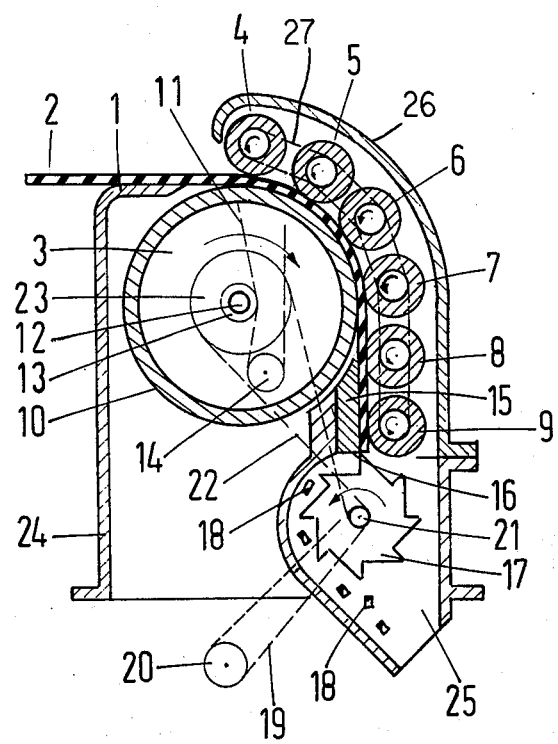

MACHINE FOR GRANULATING STRANDS OF MATERIAL

The present application is a continuation application of copending application Ser. No. 494,494 filed Aug. 5, 1974, now abandoned.

BACKGROUND OF THE INVENTION

The present invention relates to a material transport device for a granulating apparatus, especially for granulating long strands or sheets of material, such as plastics material.

An apparatus of this type is described in U.S. Pat. No. 3,837,586 granted on Sept. 24, 1974 and assigned to the same assignee. The apparatus of said patent as well as of the present application is intended for granulating strands or sheets of synthetic materials, elastomeric or similar materials and includes a feed-in mechanism arranged upstream of a cutting or granulating tool, as viewed in the feed advance direction of the material to be granulated. The feed-in mechanism comprises a feed-in table arranged substantially tangentially relative to a transport cylinder. A run-off table arranged downstream of the transport cylinder also extends substantially tangentially relative to the transport cylinder. The downstream end of the run-off table provides a counter ledge for the cutting tool.

In U.S. Pat. No. 3,837,586, a material feed and guide channel is formed by an endless conveyor belt which extends substantially from the feed-in table to the counter ledge or edge of the run-off table. The endless conveyor belt runs over two rollers and preferably also over a tensioning roller so that the run of the belt which faces the transport cylinder conforms to the circumference of the cylinder from a feed-in point to the run-off table whereby the downstream guide roller of the conveyor belt is arranged substantially opposite the downstream end of the run-off table. In order to assure that the strands are guided as close as possible to the cutting tool, it is necessary to make the diameter of the guide roller adjacent to the cutting tool as small as possible. This is desirable for a good guidance and transport of the strands to be granulated. However, a small diameter guide roller causes, especially in connection with high feed advance speeds of the strands, a respectively fast turn around of the transport belt about an almost acute or pointed turn around point. As a result, the transport belt is exposed to substantial loads at such turn around point.

OBJECTS OF THE INVENTION

In view of the above, it is the aim of the invention to achieve the following objects, singly or in combination:

to construct the guide means for an apparatus of the above described type in which an excessive wear and tear of the transport belt is eliminated while simultaneously assuring a proper guidance of the material to be granulated all the way to the cutting tool;

to assure a proper guidance of the material without the use of a transport belt; and to employ a plurality of pressure rollers which are driven in unison or in synchronism with the transport cylinder.

SUMMARY OF THE INVENTION

According to the invention there is provided a guide mechanism for a granulating apparatus in which a transport cylinder is arranged between a feed-in table and a run-off table extending substantially tangentially relative to the transport cylinder. A row of pressure rollers is arranged opposite the transport cylinder from a feed-in point adjacent to the feed-in table substantially all the way toward the end of the run-off table. The pressure rollers have a diameter which is substantially smaller than the diameter of the transport cylinder. The last pressure roller in the row is arranged immediately adjacent to the cutting tool opposite the run-off table as viewed in the feed advance direction of the material.

Due to the arrangement of the pressure rollers in a row or chain so that the rollers follow each other with very little spacing between adjacent rollers and due to the small diameters of the pressure rollers, a corresponding number of pressure locations are established along the row of pressure rollers. The pressure locations are closely spaced from each other due to the small diameter of the pressure rollers whereby a substantially uninterrupted guidance is assured for the strand or sheet material. It has been found that the short spacing between adjacent pressure locations do not influence the proper guiding of the material. Another advantage of the invention is seen in that the pressure rollers perform merely a rotational movement but not a longitudinal movement whereby during the continuous operation of the apparatus acceleration and deceleration forces are obviated and whereby the useful life of the apparatus and especially of the pressure rollers has been substantially increased as compared to the transport belt.

BRIEF FIGURE DESCRIPTION

In order that the invention may be clearly understood, it will now be described, with reference to the single FIGURE of the accompanying drawing, which illustrates a sectional side view through an apparatus according to the invention whereby non-essential details have been omitted.

DETAILED DESCRIPTION OF AN EXAMPLE EMBODIMENT

The apparatus for granulating material comprises a housing 24 the lower end of which is provided with a discharge chute 25 for the granular material 18. A housing member 26, which is preferably removable, is arranged for supporting a row of pressure rollers 4, 5, 6, 7, 8, and 9 as will be described in more detail below.

A substantially horizontally extending portion of the housing forms a feed-in table 1. The strands 2 of material to be granulated advance over the feed-in table 1 from left to right in the FIGURE. A feed-in point is formed adjacent to the feed-in table 1 between the transport cylinder 3 and the first pressure roller 4. According to the invention, a group of six pressure rollers, as mentioned above, is arranged in a row the upper end of which is curved to conform to the circumferential portion of the transport cylinder 3 and the lower end of which extends tangentially relative to the transport roller and substantially in parallel to a run-off table 15 supported at the upper end of the discharge chute 25. Elastically yielding means are provided for constantly pressing the strands 2 against the surface of the transport cylinder 3. To this end the axes of the rollers 4 to 9 may be spring biased toward the transport cylinder 3. Respective spring means would be arranged at each end of the respective pressure roller axis whereby the axis may be guided in respective slots in the housing portion 26, such slots also holding the respective biasing spring. If desired, the spring pressure may be adjusted, for example by screw means.

In an alternative embodiment, the constant biasing pressure for holding the strands 2 against the surface of the transport cylinder 3 may be accomplished by providing each pressure roller 4 to 9 and the transport cylinder 3 with an outer jacket of elastomeric material, such as a rubber or a hard foam. In any event, the pressure will be exerted on the strands or sheets of material to be granulated, at least throughout their travel along the surface of the transport cylinder 3.

The pressure rollers 4 to 9 have a diameter which is substantially smaller than the diameter of the transport cylinder 3. Further, the pressure rollers are relatively closely spaced from each other, whereby in combination with the small diameter a plurality of pressure locations are formed which are correspondingly closely spaced from each other whereby the strands are effectively guided through the transport channel formed by the transport cylinder 3 and the pressure rollers as well as the run-off table. The pressure rollers 4 to 9 are positively driven, for example, by a chain drive 27 linking all transport rollers with each other for synchronous rotation whereby all pressure rollers 4 to 9 are driven with the same speed. Since all pressure rollers have the same diameter, the same circumferential speed is established along each pressure location opposite the transport cylinder 3. As a result, a uniform feed advance is provided for the strands 2. However, it has been found not to be necessary to provide a positive drive for the pressure rollers 4 to 9. For example, where sufficient friction may be established between the strands 2 and the pressure rollers, the rotation of the pressure rollers may be accomplished by the friction between these rollers and the strands and only the transport cylinder 3 would be positively driven.

As mentioned above, the pressure rollers 4 to 9 may be provided with a jacket of elastomeric material. Similarly, the transport cylinder 3 may also be provided with a jacket 10 of elastic material in order to limit the pressure load applied to the strands and simultaneously to extend the surface area on which frictional forces may be applied to the strands. The elastic jacket 10 may also be made of elastic synthetic material or rubber. The strands are somewhat enveloped by the jacket 10 of elastic material of the transport cylinder 3 and by the elastic jacket of the rollers 4 to 9 so that an especially efficient entraining action is accomplished. However, depending upon the type of material to be granulated, it would also be possible to provide only the pressure rollers 4 to 9 with a jacket of elastic material. The positive drive of the transport cylinder 3 is coupled to the chain drive 27 of the rollers 4 to 9 by means of a chain 11 running over a sprocket wheel 13 secured to the axis 12 of the transport cylinders 3 and linked to a respective sprocket wheel on the roller 4. The ratio of the sprocket wheels is selected in such a manner that the transport cylinder 3 and the transport rollers 4 to 9 rotate with the same circumferential speed, whereby the direction of movement at the pressure location is the same at all pressure locations between the transport cylinder 3 and the pressure rollers 4 to 9. Preferably, the chain 11 runs over a guide sprocket or roller 14 for properly tensioning the chain 11.

As the strands 2 are entrained into the guide channel formed between the transport cylinder 3 and the pressure rollers 4 to 9, they are advanced toward the run-off table 15, the downstream end 16 of which forms a counter ledge or edge for the rotary cutting tool 17. The last pressure roller 9 is arranged immediately adjacent to the cutting tool 17 opposite the run-off table 15. Thus, a positive guiding of the strands 2 is accomplished all the way to a point immediately ahead of the cutting tool 17. The pressure roller 8 provides a certain guiding for the strands 2 in the area where the strands 2 pass over from the transport cylinder 3 to the run-off table 15.

The cutting tool 17 is driven, preferably also by a chain drive 19, linking a drive sprocket 20 with a sprocket 21 on the shaft of the rotary cutting tool 17. The drive sprocket 20 is driven by a motor not shown. A further chain drive 22 links a further sprocket on the shaft of the tool 17 with a sprocket 23 on the shaft 12 of the transport cylinder 3. Thus, it will be seen that starting with the drive sprocket 20 all rotating elements of the apparatus are driven in synchronism with each other including the pressure rollers 4 to 9 as described above.

The apparatus operates as follows. The strands of sheets 2 of material to be granulated are supplied over the feed-in table 1 where they are entrained at the feed-in point between the pressure roller 4 and the transport cylinder 3 whereby, due to the pressure exerted by the pressure roller 4, a feed advance force is applied to the strands which are thereby moved passed the further pressure rollers 5, 6 and 7 which keep the strands in frictional contact with the transport cylinder 3 until the strands reach the run-off table 15 where they come into contact with the last pressure roller 9. Due to this guiding of the strands 2 by means of a plurality of relatively closely spaced pressure locations all the way to a point immediately ahead of the tool 17, there is no possibility for the strands to bulge, especially at a point just ahead of the knife as viewed in the transport direction, whereby a uniform granulation is accomplished. The granular material 18 is discharged through the chute 25. Depending on the width of the apparatus, it is possible to granulate a corresponding number of strands arranged in parallel to each other, whereby it is further possible to granulate strands of different size or diameter, since the elastic jacket, especially the jackets 10, is capable of accommodating such different size strands.

Although the invention has been described with reference to a specific example embodiment, it is to be understood, that it is intended to cover all modifications and equivalents in the scope of the appended claims.

What is claimed is:

1. In an apparatus for granulating elongated material including housing means, a rotary cutting tool supported in said housing means, a transport cylinder arranged for rotation in said housing means, a feed-in table arranged, as viewed in the direction of material advance, upstream and substantially tangentially relative to said transport cylinder and reaching toward an infeed point, a run-off table arranged also substantially tangentially relative to said transport cylinder, said run-off table having a downstream end forming a counter ledge for said rotary cutting tool which is arranged for cooperating with said counter ledge, and material guide means arranged for cooperation with said transport cylinder, the improvement comprising a row of rollers each of which is a pressure roller, said row of pressure rollers forming said guide means, said pressure rollers having diameters substantially less than the diameter of said transport cylinder, means for rotatably supporting said pressure rollers in said housing means adjacent to said transport cylinder so that the first, upstream pressure roller is located to form together with said transport cylinder said infeed point, and so that the last, downstream pressure roller in the row is located substantially opposite said run-off table, said pressure rollers being closely spaced from each other so as to form a chain of closely adjacent parallel pressure lines at the periphery of the pressure rollers in contact with the material to be granulated, said parallel pressure lines extending across the width of the transport cylinder from said infeed point to said run-off table, said pressure rollers providing the sole guiding means for said material on the side thereof away from said transport cylinder.

2. The apparatus according to claim 1, wherein said last pressure roller in the row is located substantially opposite said counter ledge.

3. The apparatus according to claim 1, wherein each of said pressure rollers has the same diameter.

4. The apparatus according to claim 1, further comprising positive drive means operatively connected to said transport cylinder and to said pressure rollers for driving the pressure rollers and the transport cylinder in synchronism with each other, said drive means including gear means so that the circumferential speed of all rollers and of the transport cylinder is the same and in the same direction where the rollers face the transport cylinder.

5. The apparatus according to claim 4, wherein one of said pressure rollers in said row is located in the region between said transport cylinder and said run-off tables.

6. The apparatus according to claim 1, further comprising drive means operatively connected to said rotary cutting tool and to said transport cylinder for driving the cutting tool and the transport cylinder in synchronism with each other.

7. The apparatus according to claim 1, further comprising elastic means for elastically guiding the material to be granulating from said infeed point to said rotary cutting tool.

8. The apparatus according to claim 7, wherein said elastic means comprise jackets of elastically yielding material on said pressure rollers and on said transport cylinder.

9. The apparatus according to claim 1, wherein said housing means comprise a separate housing member in which said pressure rollers are supported for rotation.

10. The apparatus according to claim 1, wherein said row of pressure rollers has a curved end conforming to said transport cylinder and a straight end leading substantially tangentially away from said transport cylinder and in parallel to said run-off table.

* * * * *